Figure 7:
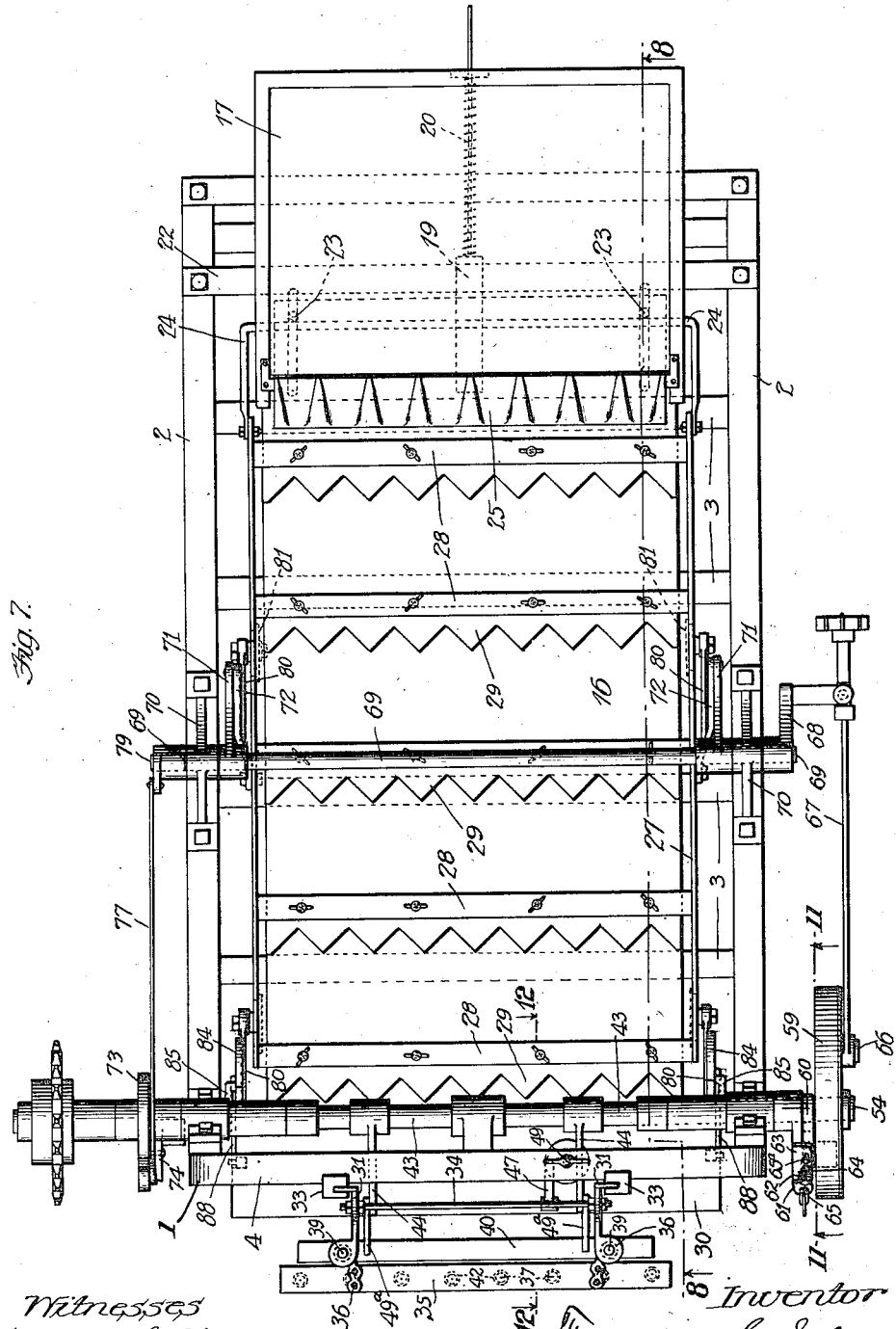

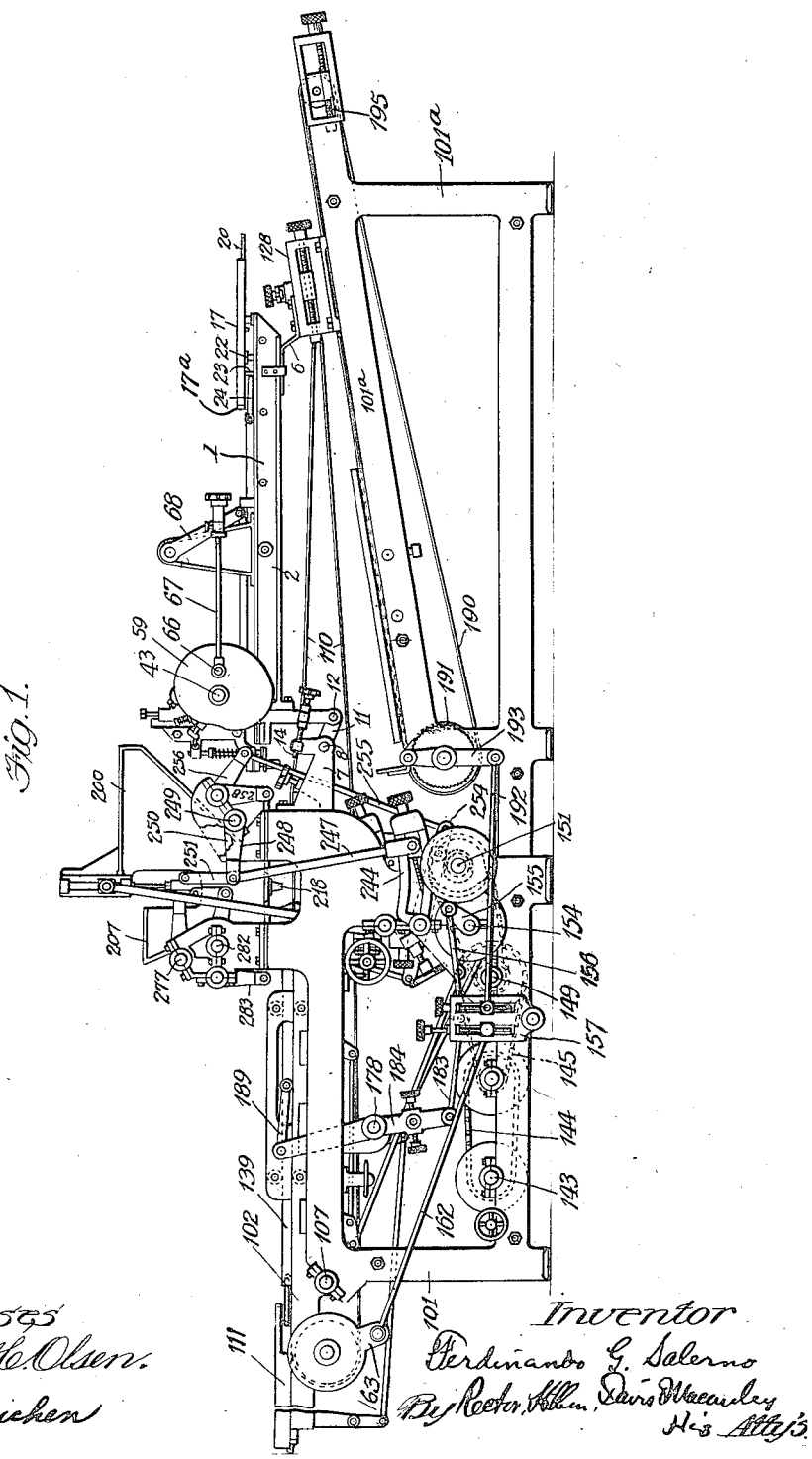

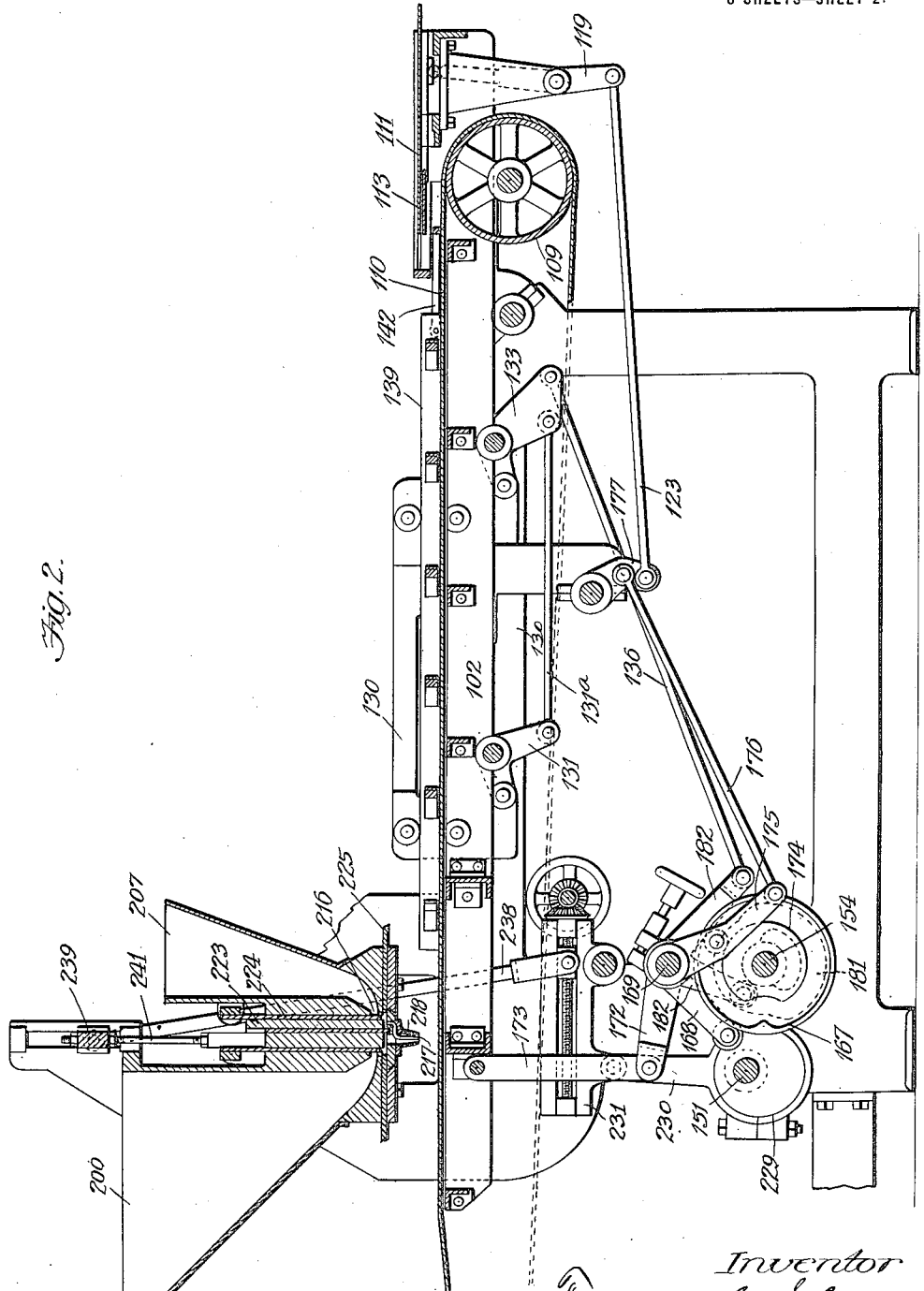

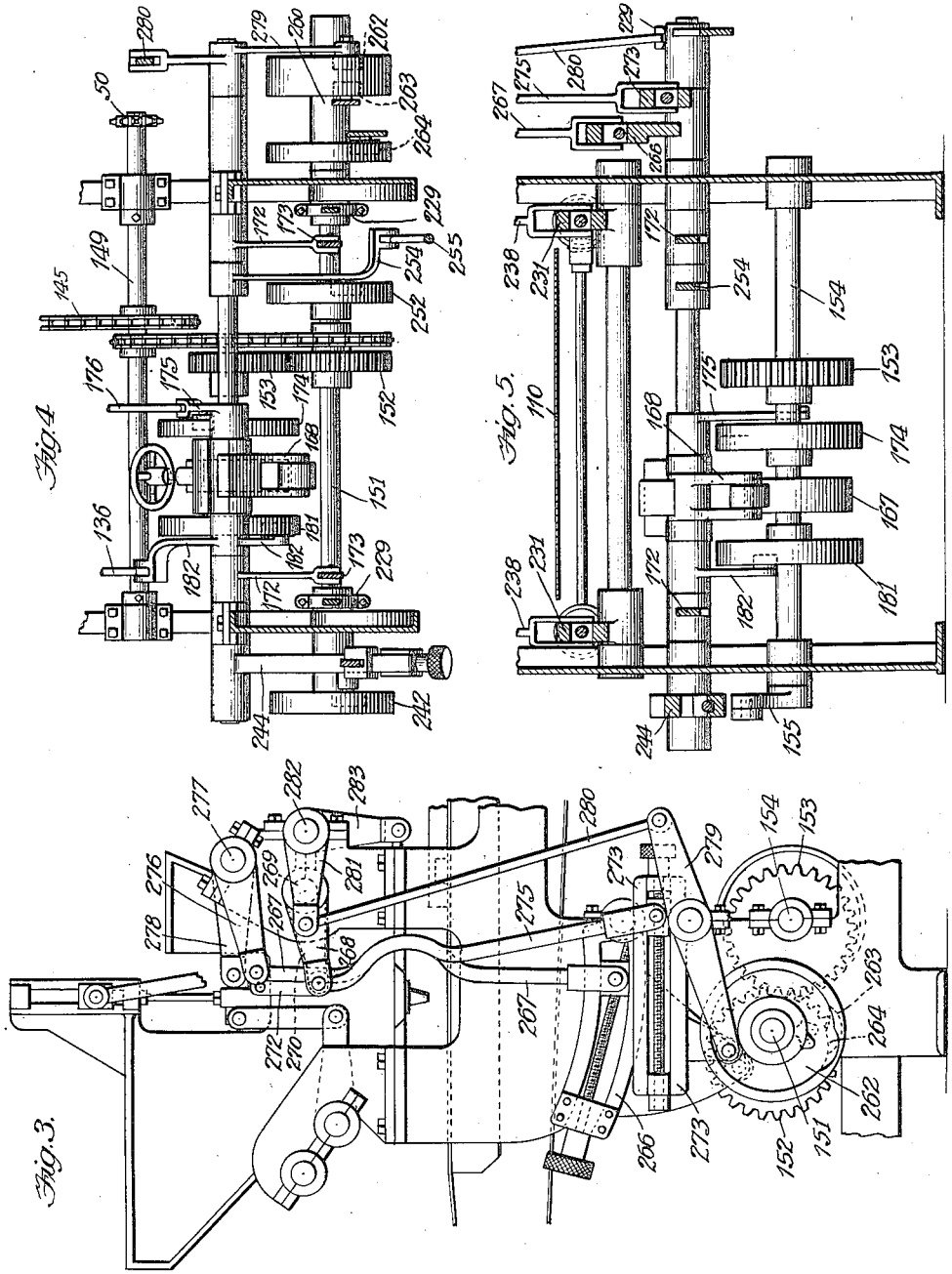

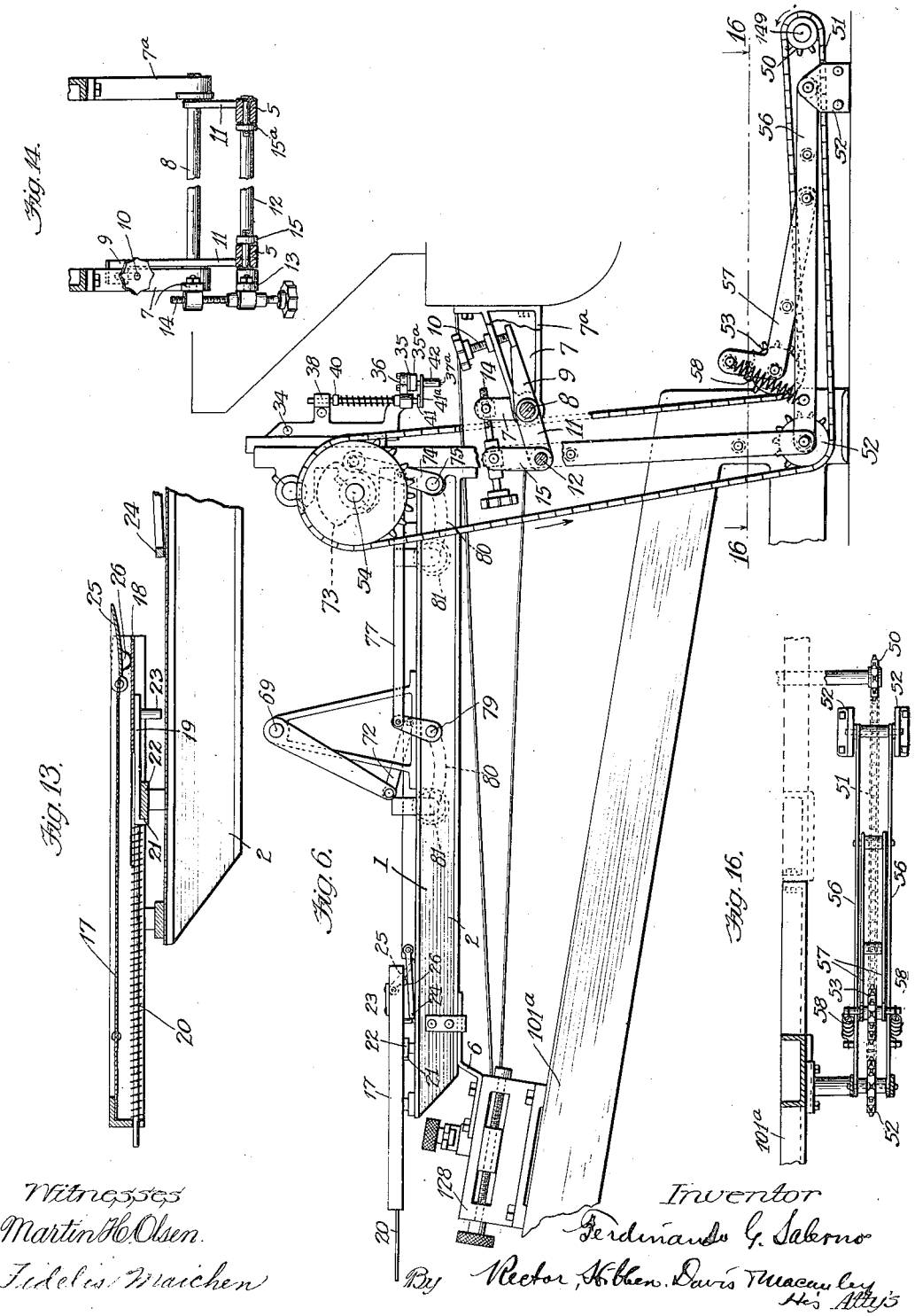

F. G. SALERNO.
DEPOSITING MACHINE.
APPLICATION FILED AUG. 12, 1916. RENEWED APR. 26, 1918.

1,285,402.

Patented Nov. 19, 1918.
8 SHEETS—SHEET 5.

Witnesses
Martin H. Olsen.
Fidelis Maichen

Inventor
Ferdinando G. Salerno
By Rector, Hibben, Davis & Macauley
His Attys.

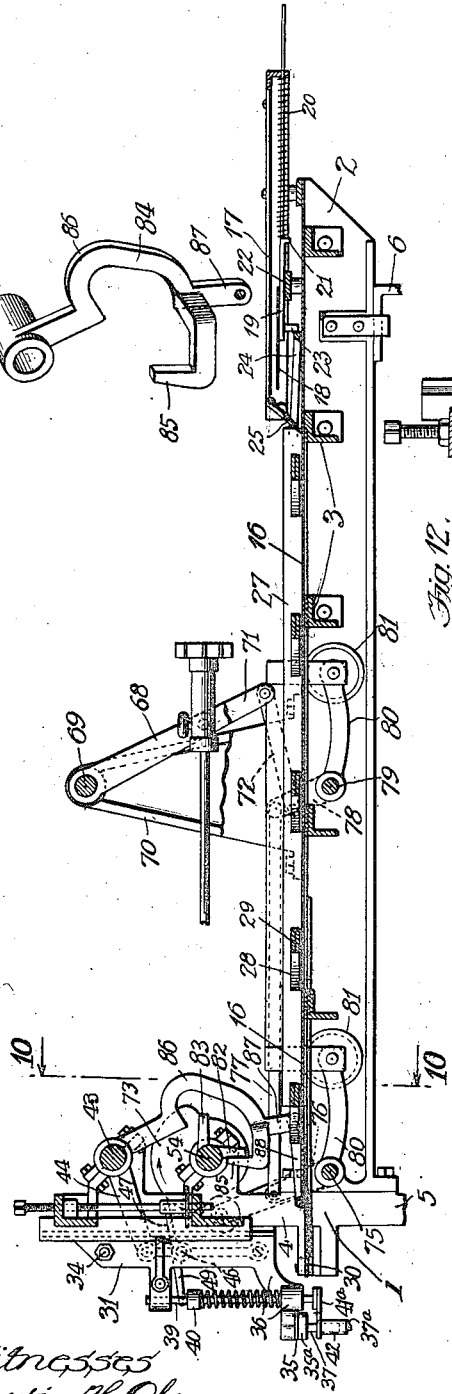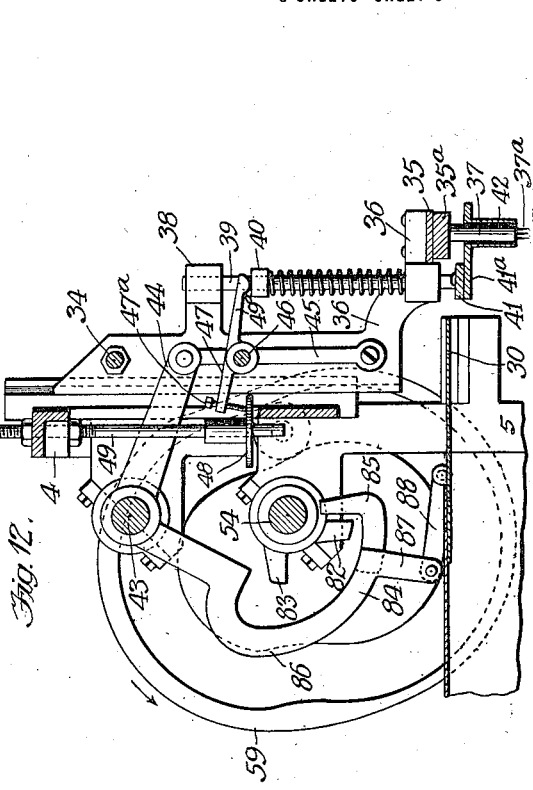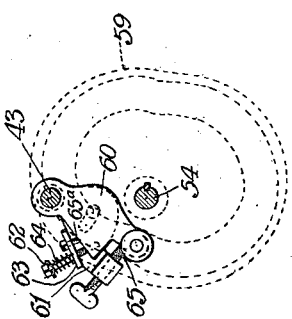

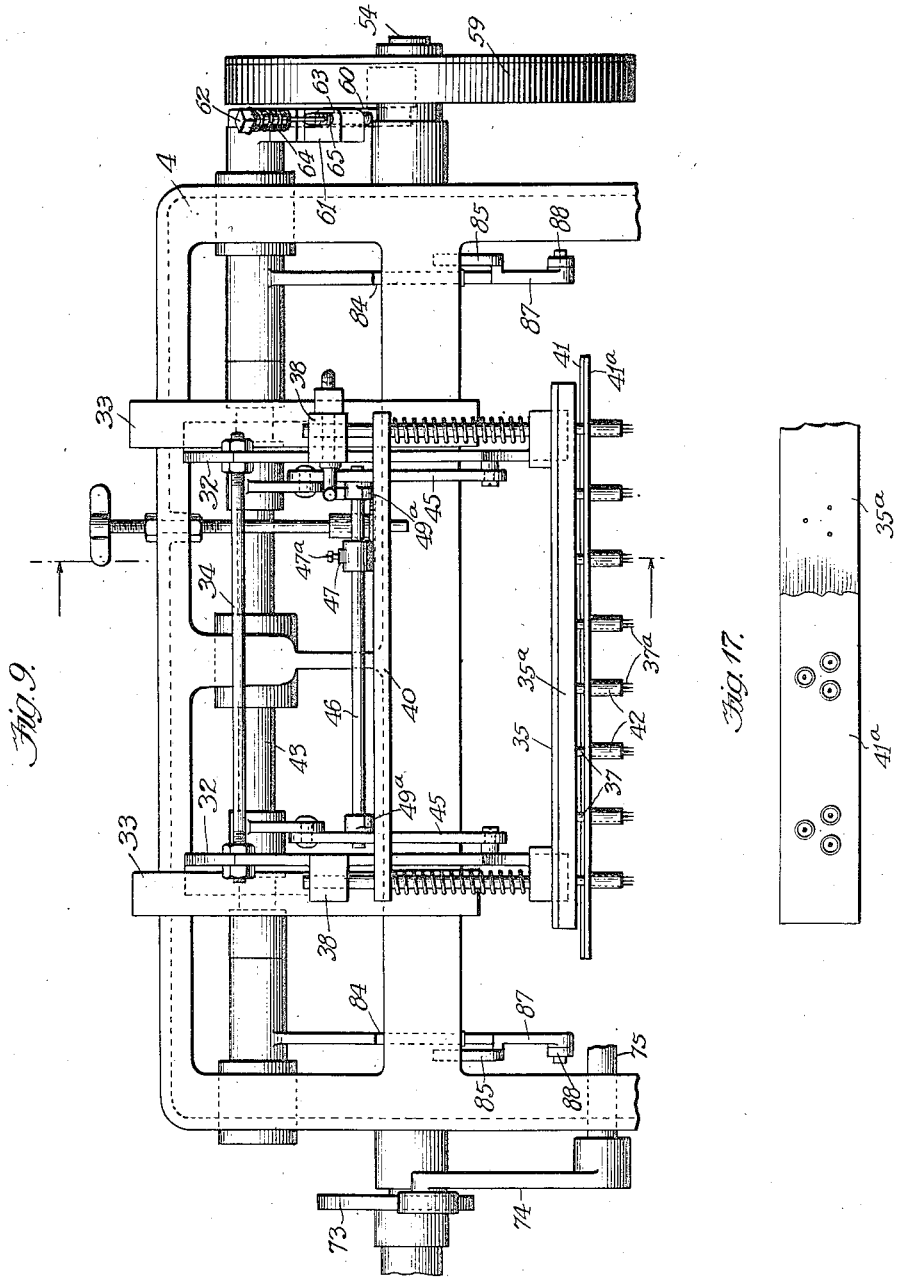

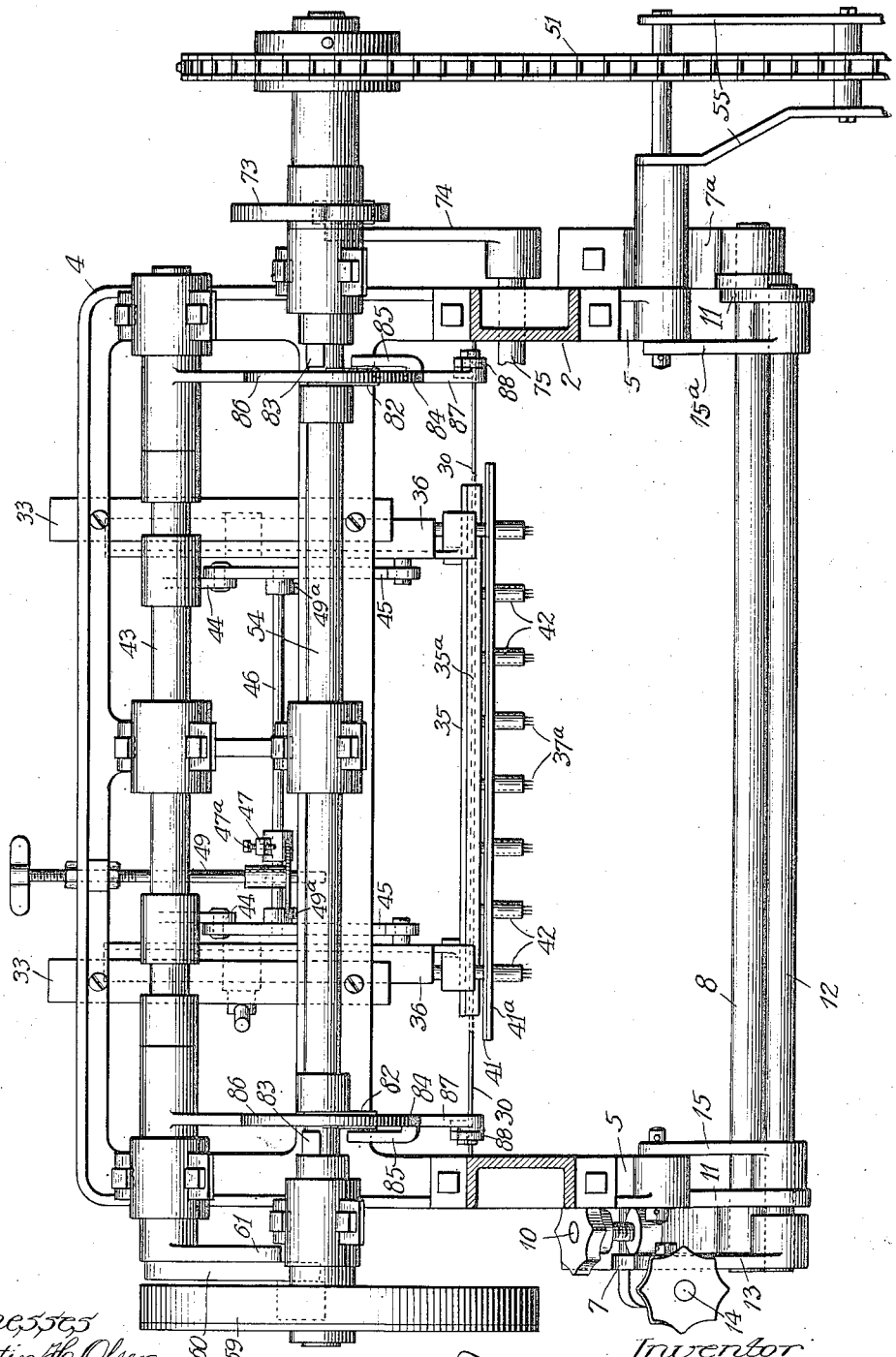

UNITED STATES PATENT OFFICE.

FERDINANDO G. SALERNO, OF CHICAGO, ILLINOIS.

DEPOSITING-MACHINE.

1,285,402.　　　　　Specification of Letters Patent.　　Patented Nov. 19, 1918.

Application filed August 12, 1916, Serial No. 114,571.　Renewed April 26, 1918.　Serial No. 231,026.

*To all whom it may concern:*

Be it known that I, FERDINANDO G. SALERNO, a citizen of the United States, and resident of Chicago, in the county of Cook and State of Illinois, have invented a certain new and useful Improvement in Depositing-Machines, of which the following is a specification.

In my pending application for Patent No. 834,780, filed April 27th, 1914, I have described a machine which is adapted to make deposits of any desired plastic or semi-fluid confection upon the tops of flat cakes or wafers fed through the machine in rows upon the top of a conveyer belt. My present invention may be regarded as an addition to and improvement upon that machine, and is intended to adapt the machine to deposit nut kernels on top of the confection, or wafers or cakes, either like those upon which the deposit of confection was made, or different, in order to form a great variety of fancy wafers and sandwiches. The object of my invention, therefore, is the provision of such an attachment, whereby a much greater variety of fancy cakes, wafers, confections, etc., may be produced, and its novelty resides in the new organization which results from incorporating it in machines such as that of my prior application, and in the arrangement and construction of elements by which it accomplishes the functions for which it is designed, and in various details of construction which are more particularly recited and pointed out in the appended claims.

Of the drawings, Figure 1 is a right side elevation of a depositing machine to which my invention is applied; Fig. 2 a longitudinal vertical section of a portion of the same viewed in the opposite direction and showing certain operating connections; Fig. 3 is a left side elevation of part of the depositing machine showing other connections; Fig. 4 is a top view of two cam shafts near the base centrally of the machine, showing the arrangement of the cams and gears mounted upon them; Fig. 5 is a vertical cross-section of the lower part of the machine, taken centrally and also showing the arrangement of gears and cams for the operating connections; Fig. 6 is a side view, partly in section and partly in elevation, looking from left to right, of the supplemental or additional portion of the machine which constitutes my present invention; Fig. 7 is a top plan view of the same; Fig. 8 is a vertical longitudinal section of the same on the line 8—8 of Fig. 7; Fig. 9 is a front view of the same; Fig. 10 is a vertical cross-section of the same on the line 10—10 of Fig. 8 and looking in the direction of the arrows; Fig. 11 is a detail on the line 11—11 of Fig. 7 illustrating a yielding connection intermediate a cam lever and a rock shaft actuated by it; Fig. 12 is a view on the line 12—12 of Fig. 7 showing the transfer frame at the front end of my new mechanism, and a hooked cam arrangement for operating a slide at the front end of the feed table; Fig. 13 is a longitudinal section through the rear end of the feed table and through the distributing table; Fig. 14 is a fragmentary top view of the parts by which the front end of the supplemental frame is adjustably supported; Fig. 15 is a perspective of one of the cam hooks by which a sliding plate at the front end of the feed table is actuated; Fig. 16 is a top view of a portion of the compensating connection for the driving chain by which the supplemental mechanism is driven; and Fig. 17 is a fragmentary bottom plan view of a modified form of needle bar and stripper plate.

The same letters of reference indicate the same parts in all the figures of the drawings.

In order that the construction and arrangement of the devices which constitute my present invention may be understood, I have illustrated in the drawings, and will first briefly describe the machine of my before-mentioned pending application, although it will be understood that my invention may be applied to other depositing machines varying considerably in construction. The description which will now be given is therefore merely illustrative of a particular suitable machine to which my invention may be applied, illustrated more particularly in Figs. 1 to 5.

Upon a cross rod 107 which forms part of the fixed frame 101 of the depositing machine, is pivoted a rocking table 102, over the flat top of which passes the upper reach of an endless conveyer belt 110 which at its rear end passes over a driving drum 109 journaled in the table 102 and at its front end passes around a narrow cross bar adjustably supported in brackets 128 carried by the main frame of the machine. The front end of the table is given an intermittent vertical oscillating movement, and the belt an intermittent movement forwardly over the table by connections hereinafter described.

Traveling around a driving drum 191 and an idler drum 195 in a forward extension 101ª of the frame of the machine is a delivery belt 190, the center part of the top reach of which lies immediately beneath and in close proximity to the front end of the conveyer belt 110.

Above the rear end of the conveyer belt is arranged a distributing table 111, at the front of which is a reciprocating slide 113 which acts to drop successive rows of cakes onto the surface of the belt as it is intermittently withdrawn rearwardly under the surface of the table.

Forwardly of the trap slide and between it and the depositing mechanism, a spacing and feeding frame 139 is arranged to move the rows of cakes successively dropped by the trap slide forwardly over the surface of the conveyer belt. The frame comprises a gang of bars which have a horizontal reciprocating sliding movement in a lifting frame 130, which latter frame is mounted in and has a rising and falling movement with respect to the pivoted table 102, so that a four way movement is imparted to the feeding frame to move the cakes forwardly on the belt, then rise to clear them, then move rearwardly in upper position and fall behind the next rows, and so on. A bail 142 is connected to the rear of the frame 139 and so arranged as to slide upon the surface of the belt back and forth under the slide 113.

The depositing mechanism of the machine comprises two tanks 200 and 207 for two different varieties of confections, and two forcing mechanisms connected with the two tanks and acting to force the confections out through two sets of depositing nozzles 217 and 218 respectively associated therewith, and concentrically arranged. In the present instance the two depositing mechanisms are alike, except in size, and each mechanism includes a flat rectangular forcing chamber extending across the machine and communicating by a port 216 with its associated tank and at its bottom communicating through a series of ports with all of the nozzles associated with it. The top of each forcing chamber is formed by a vertically reciprocating flat plunger or piston 223 and a supply valve 224, and the series of nozzles associated with it is controlled by a horizontal shut-off valve 225.

The connections for operating the moving elements of the machine thus far mentioned may vary in construction and arrangement, but a suitable and practical organization, which is fully described in my pending application, will here be briefly explained. The power shaft 143 of an electric motor by which the machine is designed to be driven communicates power through a belt 144 and sprocket and chain reducing gearing 145 to a shaft 149, which as hereafter will be seen communicates power to the novel mechanism which constitutes my present invention. Through a second sprocket and chain reducing gearing a shaft 151 is driven, and an eliptical gear wheel 152 secured to said shaft and meshing with an eliptical gear wheel 153 secured to a shaft 154 serves to drive the latter with a periodically variable speed. Through the shafts 151 and 154 the moving parts above mentioned are actuated.

First describing the parts actuated by the shaft 154, the table 102 is supported and oscillated in the following manner.—see more particularly Fig. 2. A cam 167 secured to said shaft oscilates an arm 168 adjustably connected with a rock shaft 169 to which is secured a pair of rock arms 172 connected by links 173 with the front end of the table. The lifting frame 130 is raised and lowered—see Fig. 2,—through a cam 181 on the shaft 154, a bell-crank lever 182 carrying a cam roller, and a connecting rod 136 connected to a rear pair of bell crank levers 133 which by connecting rods 131ª are connected to a similar front pair of bell cranks 131, the bell cranks 131 and 133 being pivotally connected to the frame 130. The feeding frame 139 is reciprocated horizontally, see Fig. 1, through a crank arm 155 on said shaft 154 which is connected by a pitman 156 with a rocking frame 157, the top of this frame being connected by a rod 183 with a lever 184 adjustably connected with a rock shaft 178 carrying a pair of rock arms connected by links 189 with said frame 139.

The rocking frame 157 also serves for the actuation of the drums of the conveyer belt and the delivery belt (see Fig. 1) through rods 162 and 192 which are respectively connected to levers 163 and 193, and through pawl and ratchet mechanisms serve to give an intermittent turning movement to the two drums.

The reciprocating slide 113 is actuated—see Fig. 2,—through a cam 174 carried by said shaft 154, which cam coöperates with a cam-roller on a rocking lever 175 connected by a link 176 with a second rocking lever 177, which last mentioned lever is in turn connected by a connecting rod 123 with a lever 119 arranged to reciprocate said slide.

The shaft 151 actuates the plungers and supply and shut-off valves of the two depositing mechanisms. The plunger of the mechanism of larger capacity, the parts of which may conveniently be distinguished by the term marshmallow, is reciprocated through a pair of eccentrics 229 mounted on said shaft 151 and connected to arms 230 which are pivoted to rocking adjusting frames 231, see Fig 2, the adjusting frames being connected by a pair of rods 238 to a sliding cross bar 239 to which are pivoted a pair of depending links 241 secured to the top of the plunger. The marshmallow supply valve is operated through a cam disk 242 on said shaft 151 coöperating with a roller on a rocking adjusting frame 244, see Fig. 1, which frame is connected by a rod 247 with a crank 248 on a rock shaft 249 provided with a pair of rock arms 250 pivoted to a pair of links 251 which are in turn pivoted to the ends of the supply valve. The marshmallow shut-off valve is actuated by means of a cam disk 252 which coöperates with a roller on a rocking lever 254, see Fig. 1, pivotally connected by a rod 255 with a crank 256 on a rock shaft having a pair of rock arms 258 which are pivotally connected with the ends of such valve.

The plunger and valves of the small or jelly depositing mechanism are operated by three cam disks secured to a sleeve 260 which is adjustably secured to the shaft 151, in order that the timing of the jelly depositing mechanism may be varied with respect to the marshmallow depositing mechanism, see Figs. 3 and 4. The jelly plunger is operated through the cam slot 263, which engages a cam roller carried by a rocking adjusting frame 273 which is pivotally connected by a rod 275 with a crank arm 268 on a rock shaft 269, this rock shaft carrying a pair of rock arms 270, pivotally connected to a pair of links 272 which are pivoted to said plunger. The jelly supply valve is operated through the cam slot 264 which coöperates with a roller carried by a rocking adjusting frame 266, which frame, through a pivoted connecting rod 267, rocks a crank 276 fixed to a shaft 277 equipped with a pair of rock arms 278 pivotally connected with the ends of the supply valve. The cam slot 262 controls the jelly shut-off valve through a cam roller carried by a rocking lever 279, which lever, through a pivoted connecting rod 280, rocks a crank 281 fast on a rock shaft 282 which carries a pair of rock arms 283 pivoted to the ends of said shut-off valves.

The timing and adjustment of the parts thus far described is such that the bail 142 will draw forwardly the row of cakes or wafers arranged by the attendants upon the slide 113 and then dropped on the surface of the conveyer belt 110 in front of such bail. Successive rows are thus drawn forward and spaced and moved forward by the frame 139 on the surface of the conveyer belt, which itself has an intermittent forward movement. The frame 139, however, moves the faster, and its movement begins preferably before the movement of the belt, and ends preferably later, with the result that the cakes are accurately positioned on the belt, and the front row brought into exact alinement with the depositing nozzles. After the wafers receive the deposits of confection, they travel forwardly with the conveyer belt as its step by step movement is imparted to it, and pass onto trays which are placed by attendants upon the delivery belt and removed therefrom as they are filled.

My present invention, which is more particularly illustrated in Figs. 6 to 15, as before stated consists in the provision of additional mechanism by which either nut kernels, as the halves of split English walnuts, or additional wafers, can be placed on top of the deposits of confection made by the machine above described. In the present instance, and preferably, this mechanism is all mounted in and associated with a supplemental frame, so that by the disconnection of a few parts it can be removed and replaced as a unit, but it will be understood that it may be built into and incorporated with the depositing machine if desired.

The supplemental frame 1 in which the moving parts of my new mechanism are mounted may conveniently consist of a horizontal portion made up of a pair of longitudinal side bars 2 secured together by cross-bars 3, see Figs. 7 and 8, and a vertical portion at what will be termed the front of the attachment comprising a U-shaped top frame member 4 and depending posts 5, see Figs. 9 and 10, all secured rigidly together, and provided with bearings for the sliding and rotating elements of the machine. At the rear the frame is supported by a pair of brackets 6 fixed to the side bars 2 of the frame and bolted to a fixed portion of the forward extension 101$^a$ of the frame of the depositing machine. It will be observed that the words front and rear indicate directions the reverse of that used in describing the depositing machine, because of the fact that the movement of the nuts or wafers acted on is in the opposite direction. In the present instance the brackets 6 are bolted to the top of the brackets 128 in which the cross bar supporting the front end of the conveyer belt is adjustably mounted, see Fig. 6, and the bolt holes are elongated to permit adjustment of the supplemental frame. At the front end of the frame 1 the posts 5 of such frame are adjustably secured to the main frame, 101 of the depositing machine in the following manner, see Figs. 6, 10, and 14. Bolted to the forward end of said frame 101 adjacent its opposite sides are a pair of brackets 7 and 7$^a$ in which is journaled a cross shaft 8 to one end of which, adjacent the bracket 7, is fixed an arm 9. This arm is arranged to bear against the lower end of an adjusting screw 10 threaded in a socket formed in a portion of the bracket 7 and equipped with a hand wheel. A pair of forwardly extending arms 11 are also fixed to said shaft 8, one near each end, and a second cross-shaft 12 is rotatably mounted in the front end of these arms. To this shaft 12, adjacent one end is rigidly secured an arm 13 which has a swivel connection with an adjusting bolt 14, this bolt being also equipped with a hand wheel and being screw-threaded in a socket formed in a portion of the bracket 7. The shaft 12 also has rigidly secured to it near its opposite ends two arms 15, 15ª which are pivotally connected with the lower ends of the posts. By the adjustment of the screw 10 the frame 1 can be raised and lowered, and by adjustment of the bolt 14, which through the arm 13 is eccentrically connected with the shaft 12, the frame can be longitudinally adjusted.

A plate 16 constituting a feed table extending from the rear to the front of the frame 1 is secured on top of the cross-bars 3, overhanging which table, at the rear, is arranged a distributing table 17 suitably framed and supported on the frame 1, see Figs. 6, 7 and 13. At the front end of this distributing table, and slightly below it, is arranged a trap or shutter 18 having rearwardly-extending slides at its opposite sides mounted to slide in guideways in the table and also having a rearwardly extending rectangular bar 19, the rear portion of which is cut down to form a guide rod extending through a hole in a depending flange at the rear of the table. Between this flange and the shoulder at the end of the cutaway portion of the rod is arranged a compression spring 20, which tends to force the trap forwardly into a position slightly in advance of the front edge of the feed table, in which position stops 21 will contact with a cross-bar 22 on the distributing table frame and restrain further forward movement. Projecting downwardly from the shutter 18 near its opposite ends are a pair of lugs 23 through which the shutter is intermittently forced rearwardly against the tension of the spring 20 by a sliding bail 24 pivoted to the rear of a feeding frame which will later be described. If wafers or cakes are to be operated upon to form sandwich goods, attendants at the distributing table 17 arrange a row of wafers upon the shutter 18 when the latter is in forward position, and when it is pushed rearwardly by the action of the bail 24 the wafers will fall in front of such bail.

For feeding nut kernels, however, I have devised additional feeding means which are especially adapted for that purpose, see Fig. 13. These means comprise a pivoted wing 25, journaled in bearings which are removably secured to the opposite sides of the table, the upper surface of which is preferably formed with wedge-shaped cross ribs forming chutes which become narrower toward the free edge of the wing, see Fig. 7. The lower side of the wing is provided with a rounded cam block 26 which is adapted to coöperate with the edge and upper surface of the shutter 18 to hold the wing in horizontal position and with its upper surface in approximately the same plane as the surface of the distributing table when the shutter is in forward position, and to permit the wing to swing downwardly into a position where its front edge will lie in contact with the feed table 16 as the bail 24 moves the shutter rearwardly. In this manner the wing is depressed and raised, and nut kernels arranged by the attendants between the cross ribs when it is in raised position will be slid downwardly along its inclined face as it is lowered and deposited on the feed table in front of the bail. When the wing is removed to permit wafers to be fed from the shutter 18 a detachable guard rail 17ª is preferably secured to the frame of the distributing table adjacent the front edge of the shutter, see Fig. 1.

The feeding frame above mentioned consists of side bars 27 and cross bars 28, see Figs. 7 and 8, to the underside of which are secured, in the present instance by winged screws, feeding bars 29 formed with forwardly directed V-shaped notches. This feeding frame, by connections hereinafter described, is given a four-way motion to feed the nut kernels, or cakes, as the case may be, forwardly over the surface of the feed table 16. At the final feeding stroke given each row by the front notched bar 28, the kernels or cakes are transferred to a sliding plate 30 which reciprocates in a plane slightly below the feed table and at the time of transfer is stationary adjacent the front end of such table. This plate 30 is supported by slides traveling in ways formed under the feed table 16, and is given movement by connections which will be later described to shift it forwardly from the position mentioned to a point where the row of cakes carried by it will lie in the path of a descending gang of transfer needles mounted in a vertically movable transfer frame 31 slidingly mounted in the U-shaped frame member 4. This transfer frame, see Figs. 9 and 12, consists of vertical side pieces 32, the rear portions of which are formed as slides and arranged to travel in slideways formed in vertical bars 33 bolted to and constituting part of the frame 4, the side pieces 32 being connected by a spacing rod 34 near their tops and by a cross bar 35 extending between lugs 36 projecting forwardly from near the bottom ends of the side pieces. Detachably secured to such cross bar is a needle bar 35ª equipped with a row of depending pins 37 each provided with a group of needles 37ª, in the present instance three in number, to engage the kernels or wafers intermittently presented to them by the plate 30. Projecting forwardly from near the top of the side pieces 32 of the transfer frame, and directly above a portion of the lugs 36, are lugs 38; and the lugs 36 and 38 are bored in alinement to receive the side rods 39 of a stripper frame which consists of said rods and a top cross bar 40 and bottom cross plates 41 and 41ª, the latter being detachably secured to the former, and projecting forwardly under the cross-bar 35 of the transfer frame. This plate or bar 41ª is formed with perforations corresponding in number and arrangement to the pins 37, in which perforations are fixed cylindrical stripper tubes 42 surrounding the pins and their group of needles 37ª. Coiled springs surrounding the side rods 39 are interposed between the cross-bar 40 and lugs 36 of the transfer frame yieldingly tend to maintain the stripper frame in uppermost position with respect to the transfer frame.

In Fig. 17 I have shown a slightly modified arrangement of needles and stripper tubes, particularly well adapted for operating upon wafers, in which the needles, arranged in groups but somewhat more widely spaced than in the form above described, are mounted directly on the needle bar 35ª and each needle has associated with it a separate stripper tube, the stripper tubes being arranged on the bar 41ª in the same manner as the needles upon the bar 35ª. With either arrangement of needles and tubes, the two bars are nested together, and by removing the screws by which they are respectively secured to the transfer frame and stripper frame, both bars may be removed together.

It may here be explained that by means hereafter to be described, the rock shaft 43, to which are secured a pair of rock arms 44 connected by links 45 with the lower ends of the side pieces 32, operates to raise and lower the transfer frame, see Fig. 12. To operate the stripper frame (see Fig. 12) a rock shaft 46 is rotatably mounted in bearings formed near the upper ends of the links 45, and rigidly fixed to this shaft 46 is a rearwardly projecting arm or lever 47 which carries an adjusting screw 47ª adapted to contact a disk 48 fixed on the lower end of a rod 49 which is screw-threaded into a seat in the vertical front frame member 4. A pair of rock arms 49ª are also rigidly secured to the shaft 46 and arranged to coöperate with the cross bar 40 of the stripper frame to force it downwardly with respect to the transfer frame, as the adjusting screw 47ª comes into contact with the disk 48 at the concluding part of the downward movement of the links 45 and transfer frame.

The connections for operating the various parts of my new organization will now be described. Fast upon the hereinbefore mentioned shaft 149 of the depositing machine, at what for convenience will be designated the righthand side, see Figs. 6 and 16, is a sprocket wheel 50, around which runs a sprocket chain 51 which also runs around idler sprocket wheels 52 and 53 and around a sprocket wheel carried by the main shaft 54 of the new mechanism. In order to preserve the adjustment of the chain 51 during any adjustment of the frame 1, the pivot of the connection between the arm 15ª and its adjacent post 5 of the frame is extended to pivotally engage a frame consisting of a pair of connected strips 55 the lower ends of which are pivotally connected both to the idler 52 and to a frame consisting of a pair of connected horizontal strips 56, the other ends of such strips 56 being pivoted to brackets fixed to the framework of the machine. The chain moving in the direction shown, the driving pull of the sprocket wheel 50 is sustained by the idler wheel 52 and the two frames to which it is pivoted.

The idler wheel 53 is mounted on a pivot connecting the angles of a pair of L-shaped arms 57 pivotally connected to the strips 56, and yieldingly drawn by a pair of coiled springs 58 into the bight of the return portion of the sprocket chain so as to hold it taut under any adjustment of the supplemental frame.

The shaft 54 carries at the lefthand side of the machine a cam disk 59 (see Figs. 11 and 12) formed with a cam slot on its inner face arranged to coöperate with a cam roller carried by the end of an arm 60 having a yielding connection in one direction with the rock shaft 43, which shaft, as before explained, operates to raise and lower the transfer frame 31 together with the stripper frame carried by it. The yielding connection (see Fig. 11) which provides for vertical adjustment of the transfer frame and needles, and also for cushioning the stroke of said frame, is secured by mounting the arm 60 loosely upon the rock shaft adjacent to an arm 61 rigidly secured thereto, and interposing between the head of a bolt 62 carried by the arm 60 and an abutment 63 on the arm 61 through which the bolt passes a compression spring 64 tending to produce relative rotation, and providing a stop screw 65 seated in the arm 61 and coacting against the arm 60 to positively restrain rotation under the tension of the spring, the spring yielding and acting as a buffer to relative rotation in a direction tending to compress it. It is obvious that by adjustment of the screw 65 the angular relation of the arms 60 and 61 may be varied, with consequent vertical adjustment of the position of the transfer frame. A guard screw 65ª, which after initial proper adjustment to lowermost position of the transfer frame is not intended to be varied by the operator or attendant, is provided to guard against excessive downward adjustment by the screw 65, with possible injury to the needles by contact with the sliding plate 30.

The cam disk 59 also carries on its outer face a wrist pin 66 (see Fig. 1) upon which is pivoted a pitman 67 adjustably connected at its other end to the crank 68 of a rock shaft 69 extending across the machine and journaled in a pair of brackets 70 bolted to the side bars 2 of the frame. This rock shaft has secured to it near its opposite sides a pair of rock arms 71 which are connected by a pair of links 72 to the opposite side bars 27 of the feeding frame, see Fig. 8.

The rising and falling movements of the feeding frame are imparted by a cam 73 which is secured to the shaft 54 near the lefthand side of the machine, see Figs. 6 and 8, and which coöperates with a cam roller carried by an arm 74 secured to a rock shaft 75 extending across the machine and journaled in bearings in the front vertical frame member 4. Rigidly secured to the shaft 75 on opposite sides of the machine are a pair of upwardly extending rock arms 76 which are pivotally connected by links 77 with a pair of rock arms 78 secured to a second rock shaft 79 which is thus rocked in unison with the shaft 75. The shafts 75 and 79 are each equipped with opposite rearwardly extending rock arms 80 which carry at their ends flanged rollers 81 adapted to engage and support the side bars 27 of the feeding frame.

The movement of the sliding plate 30 at the front end of the table 16 is effected by the action of two pairs of lugs 82 and 83 fixed to the shaft 54, one member of each pair being arranged near one side of the machine and the other members at the opposite side, upon a pair of hook shaped cams 84 loosely journaled upon the rock shaft 43, see Figs. 10, 12 and 14. The opposite portions of these hooks are offset from each other so as to lie in different planes, the front portion 85 of each being arranged to coöperate with the lug 82 on that side of the machine, and the rear portion 86 with the lug 83, this arrangement giving a slow forward movement and a relatively quick return. The hooks are formed with ears 87 to which are pivoted links 88 pivoted to the ends of the plate 30.

The operation of the machine will be understood from the foregoing description without detailed explanation. The timing and adjustment of parts and the contour of the cams is such that the following operations will result. The wafers or nut kernels, supplied from the distributing table by attendants as before described, will be deposited in front of the bail 24 attached to the rear of the feeding frame and drawn forwardly on its forward stroke. The frame will then rise and move rearwardly, and then fall with the rearmost notched bar behind the line of nut kernels, and in the continued operation of the machine successive rows will thus be fed forward on the table 16 in unison, the forward row passing at each stroke from the table to the reciprocating plate 30. This plate is intermittently projected forward, while the feeding frame is moving rearwardly, into the path of the transfer frame, which latter is so timed that it will descend from uppermost position to a point where the row of needles 37$^a$ will impale the row of kernels on the plate 30, and then will lift a trifle momentarily while the plate recedes, after which the transfer frame descends to lowermost position carrying the row of kernels directly down upon the coated surface of a row of cakes bearing a deposit of confection, which cakes, by the action of the depositing machine,—the movements being properly coördinated to that end,—are then standing at rest on the conveyer belt in alinement with the needles. Meanwhile, at the concluding portion of the downward stroke of the feeding frame, the stripping frame has moved relatively downward, with the result that the stripper tubes have freed the kernels from the needles which carried them. The transfer frame then rises to uppermost position again, and the operations described continue in the same sequence as before.

It will be understood that the notched feed bars 29, and cross-bar 35 carrying the groups of nedles 37$^a$, and also the stripper plate 41, are correspondingly spaced, and are removable so that interchangeable sets may be used with correspondingly interchangeable sets of nozzle bars and feeding bars on the depositing machine in order to adapt them for use with cakes and wafers of different dimensions.

I claim:

1. In a depositing machine, the combination of a conveyer having an intermittent movement, depositing mechanism arranged to make deposits of confection in rows across said conveyer, and a vertically reciprocating frame equipped with means for sustaining and superimposing cakes in rows on said deposits.

2. In a depositing machine, the combination of a conveyer having an intermittent movement, depositing mechanism arranged to make deposits of confection in rows across said conveyer, and a vertically reciprocating frame equipped with vertically arranged needles arranged to impale and sustain cakes and transfer them in rows onto the top of said deposits of confection.

3. In a depositing machine, the combination of a conveyer having an intermittent movement, depositing mechanism arranged to make deposits of confection in rows across said conveyer, a vertically reciprocating frame equipped with vertically arranged needles aranged to impale and sustain and transfer a row of cakes, and means for stripping said cakes from said needles.

4. In a depositing machine having a row of depositing nozzles and an intermittent conveyer, a horizontal feeding table above said conveyer, a horizontal reciprocating plate at the front end of said table, means for feeding cakes in rows from said table to said plate, and a sliding transfer frame reciprocating vertically in the path of said plate and arranged to transfer cakes in rows from said plate to said conveyer.

5. In a depositing machine having a row of depositing nozzles and an intermittent conveyer, a horizontal feeding table above said conveyer, a horizontal reciprocating plate at the front end of said table, means for feeding cakes in rows from said table to said plate, and a transfer frame equipped with needles, said plate being arranged to advance and present a row of cakes to said needles and said frame being arranged to descend to impale a row of cakes and lift slightly while said plate recedes.

6. In a depositing machine having a row of depositing nozzles and an intermittent conveyer, a horizontal feeding table above said conveyer, a horizontal reciprocating plate at the front end of said table, means for feeding cakes in rows from said table to said plate, and a transfer frame equipped with needles, said plate being arranged to advance and present a row of cakes to said needles and said frame being arranged to descend to impale a row of cakes and lift slightly while said plate recedes and then descend to lower the cakes onto said conveyer.

7. In a depositing machine having a row of depositing nozzles and an intermittent conveyer, a horizontal feeding table above said conveyer, a horizontal reciprocating plate at the front end of said table, means for feeding cakes in rows from said table to said plate, a transfer frame equipped with needles, said plate being arranged to advance and present a row of cakes to said needles and said frame being arranged to descend to impale a row of cakes and lift slightly while said plate recedes and then descend to lower the cakes onto said conveyer, and means for stripping said cakes from said needles.

8. In a depositing machine having a row of depositing nozzles and an intermittent conveyer, a vertically reciprocating transfer frame, said frame being equipped with a row of vertically arranged needles arranged to impale and sustain a row of cakes, and stripping means arranged to strip the cakes from said needles at the end of their downward movement.

9. In a depositing machine having a row of depositing nozzles and an intermittent conveyer, a vertically reciprocating transfer frame, said frame being equipped with a row of groups of needles arranged to impale and sustain a row of cakes, and a row of stripping tubes respectively surrounding said groups of vertically arranged needles and arranged to strip the cakes therefrom at the end of the downward movement of said frame.

10. In a depositing machine having a row of depositing nozzles and an intermittent conveyer, a vertically reciprocating transfer frame, said frame being equipped with a row of groups of vertically arranged needles arranged to impale and sustain a row of cakes, a stripper frame slidingly mounted in said transfer frame and equipped with a cross row of strippers arranged to strip the cakes from said needles at the end of the downward movement of said transfer frame.

11. In a depositing machine having a row of depositing nozzles and an intermittent conveyer, a vertically reciprocating transfer frame, said frame being equipped with a row of groups of needles arranged to impale and sustain a row of cakes, a stripper frame slidingly mounted in said transfer frame and equipped with a row of strippers, and operating means actuated in unison with said transfer frame and coöperating with a fixed abutment to shift said stripper and strip the cakes from said needles.

12. In a depositing machine having a row of depositing nozzles and an intermittent conveyer, a vertically reciprocating transfer frame, said frame being equipped with a row of groups of needles arranged to impale and sustain a row of cakes, a stripper frame slidingly mounted in said transfer frame and equipped with a row of strippers, and a pivoted lever traveling in unison with said transfer frame and coöperating with a fixed abutment at the end of a downward stroke to operate the stripper frame.

13. In a depositing machine having a row of depositing nozzles and an intermittent conveyer, a vertically reciprocating transfer frame, said frame being formed with a cross-bar equipped with a row of groups of needles arranged to impale and sustain a row of cakes, an upwardly spring-pressed stripper frame slidingly mounted in said transfer frame and formed with a cross-bar equipped with strippers, and a pivoted lever traveling in unison with said transfer frame and coöperating with a fixed abutment at the end of a downward stroke to force the stripper frame downwardly relatively to the transfer frame.

14. In a depositing machine having a row of depositing nozzles and an intermittent conveyer, a vertically reciprocating transfer frame, said frame being equipped with a row of impaling needles, a stripper frame slidingly mounted in said transfer frame, a rock shaft having a pair of rock arms, a pair of links pivotally connecting said arms and said transfer frame, a second rock-shaft journaled in bearings formed in said links, and equipped with one rock arm adapted to coöperate with a fixed abutment and another rock arm operatively connected with said stripper frame.

15. In a machine of the character described and in combination with an intermittent horizontal conveyer and cake-feeding means thereabove, a vertically reciprocating transfer frame, a rock shaft operatively connected with said frame, a rock arm on said shaft, a rocking lever loosely pivoted on said shaft, stops positively preventing relative rotation of said rock arm and loosely-pivoted lever in one direction and a spring connection providing a cushioned connection in the other direction, and means for rocking said loosely pivoted lever, whereby said transfer frame will be positively lifted and have a cushioned downward movement.

16. In a machine of the character described, a horizontal feeding table, a horizontal reciprocating plate slidingly arranged at the front end of said table, a feeding frame having a backward and forward movement and arranged to feed the cakes in rows forwardly on said table and transfer the front row from said table to said plate at each forward stroke, and means for reciprocating said plate.

17. In a machine of the character described, a feeding frame having a backward and forward movement adjacent a feeding surface and arranged to feed cakes intermittently forward thereon, a bail pivoted to the rear end of the frame and arranged to travel over the feeding surface, a distributing table arranged over the plane of the feeding surface, and a shutter slidingly mounted at the front of said table, said bail being arranged to shift said shutter rearwardly upon its rearward stroke.

18. In a machine of the character described, a feeding frame comprising a gang of notched feeding bars arranged to travel backwardly and forwardly adjacent a feeding surface, a bail pivoted to the rear end of the frame and arranged to travel over the feeding surface, a distributing table arranged above the plane of the feeding surface, and a forwardly spring-pressed shutter slidingly mounted at the front of said table, said bail being arranged to force said shutter rearwardly upon its rearward stroke.

19. In a machine of the character described, a feeding frame comprising a gang of notched feeding bars arranged to travel backwardly and forwardly adjacent a feeding surface, a bail pivoted to the rear end of the frame and arranged to travel over the feeding surface, a distributing table arranged above the plane of the feeding surface, a forwardly spring-pressed shutter slidingly mounted at the front of said table, said bail being arranged to force said shutter rearwardly upon its rearward stroke, and a forwardly projecting pivoted wing arranged above said shutter and maintained in horizontal position thereby when the shutter is in forward position and arranged to swing downwardly to the feeding surface as said table moves rearwardly.

20. In a machine of the character described, a feed table, a feeding frame including side rails and notched cross-bars, a front pair and a rear pair of bell crank levers having horizontal members equipped with rollers arranged to engage the side rails of said feeding frame, means for rocking said bell cranks in unison, and coördinated means for reciprocating said frame backwardly and forwardly on said rollers to produce a four-way feeding movement of said cross-bars.

21. In a machine of the character described and having an intermittent conveyer, a feed table, a reciprocating plate at the front of said table, a feeding frame, a transfer frame, a driven shaft, a cam on said shaft arranged to raise and lower said frame, a pitman eccentrically connected with said shaft and arranged to reciprocate said feeding frame backwardly and forwardly, cam means intermediate said shaft and reciprocating plate for operating the latter, and a second cam on said shaft operatively connected with said transfer frame to raise and lower it.

22. In a machine of the character described and having a main frame and a supplemental frame, means for adjustably supporting the supplemental frame upon the proximate portion of the main frame comprising a pair of brackets on said main frame, a rock shaft journaled in said brackets, a lever secured to said shaft and adjustably connected at its rear end with a fixed abutment, said shaft also having secured to it a pair of horizontally disposed arms, a second rock shaft journaled in said arms, a bolt eccentrically connected to said second rock shaft and arranged to adjustably secure it against rotation, and a pair of vertical arms secured to said second shaft and pivotally connected to said supplemental frame.

23. In a machine of the class described and having a main frame and a supplemental frame, means for adjustably supporting the supplemental frame upon the proximate portion of the main frame, a driving sprocket wheel rotatably mounted on the main frame, a driven sprocket wheel mounted on said supplemental frame, a sprocket chain engaging said sprocket wheels, and frame equipped with vertically arranged needles aranged to impale and sustain and transfer a row of cakes, and means for stripping said cakes from said needles.

4. In a depositing machine having a row of depositing nozzles and an intermittent conveyer, a horizontal feeding table above said conveyer, a horizontal reciprocating plate at the front end of said table, means for feeding cakes in rows from said table to said plate, and a sliding transfer frame reciprocating vertically in the path of said plate and arranged to transfer cakes in rows from said plate to said conveyer.

5. In a depositing machine having a row of depositing nozzles and an intermittent conveyer, a horizontal feeding table above said conveyer, a horizontal reciprocating plate at the front end of said table, means for feeding cakes in rows from said table to said plate, and a transfer frame equipped with needles, said plate being arranged to advance and present a row of cakes to said needles and said frame being arranged to descend to impale a row of cakes and lift slightly while said plate recedes.

6. In a depositing machine having a row of depositing nozzles and an intermittent conveyer, a horizontal feeding table above said conveyer, a horizontal reciprocating plate at the front end of said table, means for feeding cakes in rows from said table to said plate, and a transfer frame equipped with needles, said plate being arranged to advance and present a row of cakes to said needles and said frame being arranged to descend to impale a row of cakes and lift slightly while said plate recedes and then descend to lower the cakes onto said conveyer.

7. In a depositing machine having a row of depositing nozzles and an intermittent conveyer, a horizontal feeding table above said conveyer, a horizontal reciprocating plate at the front end of said table, means for feeding cakes in rows from said table to said plate, a transfer frame equipped with needles, said plate being arranged to advance and present a row of cakes to said needles and said frame being arranged to descend to impale a row of cakes and lift slightly while said plate recedes and then descend to lower the cakes onto said conveyer, and means for stripping said cakes from said needles.

8. In a depositing machine having a row of depositing nozzles and an intermittent conveyer, a vertically reciprocating transfer frame, said frame being equipped with a row of vertically arranged needles arranged to impale and sustain a row of cakes, and stripping means arranged to strip the cakes from said needles at the end of their downward movement.

9. In a depositing machine having a row of depositing nozzles and an intermittent conveyer, a vertically reciprocating transfer frame, said frame being equipped with a row of groups of needles arranged to impale and sustain a row of cakes, and a row of stripping tubes respectively surrounding said groups of vertically arranged needles and arranged to strip the cakes therefrom at the end of the downward movement of said frame.

10. In a depositing machine having a row of depositing nozzles and an intermittent conveyer, a vertically reciprocating transfer frame, said frame being equipped with a row of groups of vertically arranged needles arranged to impale and sustain a row of cakes, a stripper frame slidingly mounted in said transfer frame and equipped with a cross row of strippers arranged to strip the cakes from said needles at the end of the downward movement of said transfer frame.

11. In a depositing machine having a row of depositing nozzles and an intermittent conveyer, a vertically reciprocating transfer frame, said frame being equipped with a row of groups of needles arranged to impale and sustain a row of cakes, a stripper frame slidingly mounted in said transfer frame and equipped with a row of strippers, and operating means actuated in unison with said transfer frame and coöperating with a fixed abutment to shift said stripper and strip the cakes from said needles.

12. In a depositing machine having a row of depositing nozzles and an intermittent conveyer, a vertically reciprocating transfer frame, said frame being equipped with a row of groups of needles arranged to impale and sustain a row of cakes, a stripper frame slidingly mounted in said transfer frame and equipped with a row of strippers, and a pivoted lever traveling in unison with said transfer frame and coöperating with a fixed abutment at the end of a downward stroke to operate the stripper frame.

13. In a depositing machine having a row of depositing nozzles and an intermittent conveyer, a vertically reciprocating transfer frame, said frame being formed with a cross-bar equipped with a row of groups of needles arranged to impale and sustain a row of cakes, an upwardly spring-pressed stripper frame slidingly mounted in said transfer frame and formed with a cross-bar equipped with strippers, and a pivoted lever traveling in unison with said transfer frame and coöperating with a fixed abutment at the end of a downward stroke to force the stripper frame downwardly relatively to the transfer frame.

14. In a depositing machine having a row of depositing nozzles and an intermittent conveyer, a vertically reciprocating transfer frame, said frame being equipped with a row of impaling needles, a stripper frame slidingly mounted in said transfer frame, a rock shaft having a pair of rock arms, a pair of links pivotally connecting said arms and said transfer frame, a second rock-shaft journaled in bearings formed in said links, and equipped with one rock arm adapted to coöperate with a fixed abutment and another rock arm operatively connected with said stripper frame.

15. In a machine of the character described and in combination with an intermittent horizontal conveyer and cake-feeding means thereabove, a vertically reciprocating transfer frame, a rock shaft operatively connected with said frame, a rock arm on said shaft, a rocking lever loosely pivoted on said shaft, stops positively preventing relative rotation of said rock arm and loosely-pivoted lever in one direction and a spring connection providing a cushioned connection in the other direction, and means for rocking said loosely pivoted lever, whereby said transfer frame will be positively lifted and have a cushioned downward movement.

16. In a machine of the character described, a horizontal feeding table, a horizontal reciprocating plate slidingly arranged at the front end of said table, a feeding frame having a backward and forward movement and arranged to feed the cakes in rows forwardly on said table and transfer the front row from said table to said plate at each forward stroke, and means for reciprocating said plate.

17. In a machine of the character described, a feeding frame having a backward and forward movement adjacent a feeding surface and arranged to feed cakes intermittently forward thereon, a bail pivoted to the rear end of the frame and arranged to travel over the feeding surface, a distributing table arranged over the plane of the feeding surface, and a shutter slidingly mounted at the front of said table, said bail being arranged to shift said shutter rearwardly upon its rearward stroke.

18. In a machine of the character described, a feeding frame comprising a gang of notched feeding bars arranged to travel backwardly and forwardly adjacent a feeding surface, a bail pivoted to the rear end of the frame and arranged to travel over the feeding surface, a distributing table arranged above the plane of the feeding surface, and a forwardly spring-pressed shutter slidingly mounted at the front of said table, said bail being arranged to force said shutter rearwardly upon its rearward stroke.

19. In a machine of the character described, a feeding frame comprising a gang of notched feeding bars arranged to travel backwardly and forwardly adjacent a feeding surface, a bail pivoted to the rear end of the frame and arranged to travel over the feeding surface, a distributing table arranged above the plane of the feeding surface, a forwardly spring-pressed shutter slidingly mounted at the front of said table, said bail being arranged to force said shutter rearwardly upon its rearward stroke, and a forwardly projecting pivoted wing arranged above said shutter and maintained in horizontal position thereby when the shutter is in forward position and arranged to swing downwardly to the feeding surface as said table moves rearwardly.

20. In a machine of the character described, a feed table, a feeding frame including side rails and notched cross-bars, a front pair and a rear pair of bell crank levers having horizontal members equipped with rollers arranged to engage the side rails of said feeding frame, means for rocking said bell cranks in unison, and coördinated means for reciprocating said frame backwardly and forwardly on said rollers to produce a four-way feeding movement of said cross-bars.

21. In a machine of the character described and having an intermittent conveyer, a feed table, a reciprocating plate at the front of said table, a feeding frame, a transfer frame, a driven shaft, a cam on said shaft arranged to raise and lower said frame, a pitman eccentrically connected with said shaft and arranged to reciprocate said feeding frame backwardly and forwardly, cam means intermediate said shaft and reciprocating plate for operating the latter, and a second cam on said shaft operatively connected with said transfer frame to raise and lower it.

22. In a machine of the character described and having a main frame and a supplemental frame, means for adjustably supporting the supplemental frame upon the proximate portion of the main frame comprising a pair of brackets on said main frame, a rock shaft journaled in said brackets, a lever secured to said shaft and adjustably connected at its rear end with a fixed abutment, said shaft also having secured to it a pair of horizontally disposed arms, a second rock shaft journaled in said arms, a bolt eccentrically connected to said second rock shaft and arranged to adjustably secure it against rotation, and a pair of vertical arms secured to said second shaft and pivotally connected to said supplemental frame.

23. In a machine of the class described and having a main frame and a supplemental frame, means for adjustably supporting the supplemental frame upon the proximate portion of the main frame, a driving sprocket wheel rotatably mounted on the main frame, a driven sprocket wheel mounted on said supplemental frame, a sprocket chain engaging said sprocket wheels, and compensating means for maintaining said chain and wheels in engagement throughout the range of adjustment of said supplemental frame.

24. In a machine of the class described and having a main frame and a supplemental frame, means for adjustably supporting the supplemental frame upon the proximate portion of the main frame, a driving sprocket wheel rotatably mounted on the main frame, a driven sprocket wheel mounted on said supplemental frame, a sprocket chain engaging said sprocket wheels, and compensating means for maintaining said chain and wheels in engagement throughout the range of adjustment of said supplemental frame, said compensating means comprising a vertical bar pivotally connected at its upper end with said supplemental frame, a horizontal bar pivotally connected at one end to said vertical bar and at the other end pivotally connected to said main frame, an idler sprocket wheel rotatably mounted adjacent the pivotal connection of said bars and arranged to sustain the driving pull of said chain, and a second idler spring-pressed into coöperative relation with the return reach of said chain.

FERDINANDO G. SALERNO.

Witnesses:
S. ELIZABETH BRANDT,
LOUIS B. ERWIN.